United States Patent
Mueller et al.

(10) Patent No.: US 7,799,716 B2
(45) Date of Patent: Sep. 21, 2010

(54) PARTIALLY-ALLOYED ZIRCONIA POWDER

(75) Inventors: Michael Mueller, Westbury, NY (US); Mitchell R. Dorfman, Westbury, NY (US); Liangde Xie, Westbury, NY (US)

(73) Assignee: Sulzer Metco (US), Inc., Westbury, NY (US)

( * ) Notice: Subject to any disclaimer, the term of this patent is extended or adjusted under 35 U.S.C. 154(b) by 114 days.

(21) Appl. No.: 11/366,748

(22) Filed: Mar. 3, 2006

(65) Prior Publication Data
US 2007/0207271 A1  Sep. 6, 2007

(51) Int. Cl.
C04B 35/48 (2006.01)
C04B 35/49 (2006.01)
B05D 1/08 (2006.01)
C23C 4/00 (2006.01)
C23C 4/10 (2006.01)
H05H 1/26 (2006.01)
H05H 1/24 (2006.01)

(52) U.S. Cl. ............ 501/103; 501/102; 501/104; 427/446; 427/453; 427/576

(58) Field of Classification Search ............ 501/102, 501/103, 104; 428/472; 427/446, 453, 576
See application file for complete search history.

(56) References Cited

U.S. PATENT DOCUMENTS 3,301,646 A *  1/1967  Smoot ............... 51/309
3,849,532 A   11/1974 Deneke et al.
4,506,024 A *  3/1985  Claussen et al. ........... 501/105
4,610,967 A *  9/1986  Imanishi et al. ........... 501/103
5,155,071 A * 10/1992  Jacobson ............... 501/103
5,176,964 A   1/1993  Marousek et al.
2004/0197580 A1* 10/2004 Dorfman et al. ........... 428/472

FOREIGN PATENT DOCUMENTS

EP  0 400 306 B1   12/1990
JP  H02014822  *  1/1990
WO  WO 02/45931   6/2002

OTHER PUBLICATIONS

Guy Antou et al.; "Microstructures of partially stabilized zirconia manufactured via hybrid plasma spray process"; Ceramics International; vol. 31, No. 4, 2005, pp. 611-619.
K. A. Khor and J. Yang; "Transformability of t-$ZrO_2$ and Lattice Parameters in Plasma Sprayed Rare-Earth Oxides Stabilized Zirconia Coatings," Scripta Materialia, vol. 37 No. 9, Nov. 1, 1997, pp. 1279-1286.
J. Falbe, M. Regitz; "Römpp Lexikon Chemie", vol. 3, 1997, Georg Thieme Verlag, p. 2378.

* cited by examiner

Primary Examiner—Karl E Group
Assistant Examiner—Noah S Wiese
(74) Attorney, Agent, or Firm—Greenblum & Bernstein, P.L.C.

(57) ABSTRACT

The present invention provides a low density and porous zirconia ($ZrO_2$) powder partially alloyed with one or more of yttria, scandia, dysprosia, ytterbia, or any of the oxides of lanthanide or actinide. The total amount of alloying oxides should be less than about 30 weight percent. The powder is manufactured by controlled sintering or light plasma densification of physically agglomerated, or chemically derived zirconia composite powder that contains proper amounts of yttria, scandia, dysprosia, ytterbia, or any of the oxides of lanthanide or actinide, or any combination of the aforementioned oxides. The resulting coating from use of the inventive powder has a monoclinic phase content of less than 5 percent.

20 Claims, 3 Drawing Sheets

PARTIALLY-ALLOYED ZIRCONIA POWDER

CROSS REFERENCE TO RELATED APPLICATIONS

Not Applicable.

STATEMENT REGARDING SPONSORED RESEARCH OR DEVELOPMENT

Not Applicable.

REFERENCE TO SEQUENCE LISTING

Not Applicable.

BACKGROUND OF THE INVENTION

1. Field of the Invention

The invention relates to materials for thermal barrier coatings, and more particularly to partially-alloyed zirconia powders for use with plasma spray deposition processes.

2. Description of Related Art

Ceramic thermal barrier coatings (TBCs) have been successfully used in industrial gas turbines, aircraft engines, marine propulsion, and other hot metal applications for several years. One material is that has been used for such coating applications is zirconia ($ZrO_2$) stabilized by about seven weight percent yttria ($Y_2O_3$), a material also referred to as 7YSZ. Generally, coatings from this material provide a favorable combination of properties that include low thermal conductivity, high thermal expansion coefficient, and phase stability to a relatively high temperature range. In some cases, uses of TBCs with 7YSZ can result in a temperature reduction of up to 170° C. (300° F.) at the underlying metal surface, thus improving durability of the metal component and allowing increased engine performance. Demands for greater engine efficiency, higher performance, and increased durability have created a need for improved coatings with even better protective properties.

Deposition of the TBC may be accomplished using, for example, a plasma spray process. In this process, ceramic powder feedstock is injected into a high velocity plasma stream where it is simultaneously melted and propelled toward a substrate. When the melted particles impact the substrate they solidify to form "splats," which accumulate to form the TBC. The amount of the powder feedstock that actually becomes part of the resulting coating is a measure of deposition efficiency. Deposition efficiency may be generally defined as the ratio of the coating weight to the weight of total feedstock. Improving deposition efficiency remains an ongoing goal in the coating industry in order to both improve deposition rates and reduce material loss.

SUMMARY OF THE INVENTION

The present invention meets the aforementioned needs for improved coating performance and deposition efficiency by providing a low density and porous zirconia ($ZrO_2$) powder partially alloyed with one or more of yttria, scandia, dysprosia, ytterbia, or any of the oxides of lanthanide or actinide. The aforementioned oxides can be included individually or in any combination. In accordance with one embodiment of the invention, the total amount of alloying oxides should be less than about 30 weight percent. One example is a zirconia alloy containing about 6 to 9 weight percent of yttria. The powder is manufactured by controlled sintering or light plasma densification of physically agglomerated or chemically derived zirconia composite powder that contains the proper amounts (e.g., a total combination less than 30 weight percent) of yttria, scandia, dysprosia, ytterbia, or any of the oxides of lanthanide or actinide, or any combination of the aforementioned oxides. The powder of the present invention contains approximately 10 to approximately 75 volume percent of monoclinic phase $ZrO_2$ or unalloyed $ZrO_2$. The apparent density of the powder is in the approximate range of 1.0 to 2.0 g/cm$^3$. When used in a plasma spray deposition process under the same processing conditions, the deposition efficiency of the inventive powder is up to 50 percent or more higher than that of a fully alloyed powder of similar composition and similar particle size distribution (fully alloyed powder refers to a zirconia alloy that contains less than 10 percent monoclinic zirconia phase). The resulting coating from use of the inventive powder has a monoclinic phase content of less than about 5 percent.

In one aspect of the invention, a method of making a partially-alloyed zirconia composite powder is provided which includes the steps of (1) either providing an agglomerated powder formed by spray drying, mechanical cladding, or attrition milling or providing a chemically derived zirconia composite powder that contains proper amounts of yttria, scandia, dysprosia, ytterbia, or any of the oxides of lanthanide or actinide, or any combination of the aforementioned oxides; and (2) sintering the agglomerated powder or chemically derived powder by heating the powder to at least 1400° C., wherein the sintering process is controlled to limit the alloying degree to between approximately 25 to 90 percent.

In another aspect of the invention, a further method of making a partially-alloyed zirconia composite powder is provided which includes the steps of (1) either providing an agglomerated powder formed by spray drying, mechanical cladding, or attrition milling or providing a chemically derived zirconia composite powder that contains proper amounts of yttria, scandia, dysprosia, ytterbia, or any of the oxides of lanthanide or actinide, or any combination of the aforementioned oxides; and (2) plasma densifying the agglomerated powder or chemically derived powder in one of ambient air, low pressure or vacuum controlled atmosphere, wherein the plasma densification process is controlled to limit the alloying degree to between approximately 25 to 90 percent.

In another aspect of the invention, a further method of making a partially-alloyed a partially-alloyed zirconia composite powder is provided which includes the steps of (1) either providing an agglomerated powder formed by spray drying, mechanical cladding, or attrition milling or providing a chemically derived zirconia composite powder that contains proper amounts of yttria, scandia, dysprosia, ytterbia, or any of the oxides of lanthanide or astinide, or any combination of the aforementioned oxides; and (2) then partially alloying the powder using a combination of sintering and plasma densifying the agglomerated powder or chemically derived powder in one of ambient air, low pressure or vacuum controlled atmosphere, wherein the combination of sintering process and plasma densification process is controlled to limit the alloying degree to between approximately 25 to 90 percent.

In yet another aspect of the present invention, method of applying a coating onto a substrate is provided. The method includes the step of providing a zirconia ($ZrO_2$) partially alloyed with yttria, scandia, dysprosia, ytterbia, or any of the oxides of lanthanide or astinide, or any combination of the aforementioned oxides, wherein the powder has between approximately 10 to approximately 75 volume percent of monoclinic phase zirconia or unalloyed zirconia. Another step of the method is depositing the powder onto a substrate using a plasma spray process to form the coating, wherein the coating has a monoclinic phase content of less than 5 percent.

Additional aspects of the invention will be set forth in the description which follows, and in part will be obvious from the description, or may be learned by practice of the invention. The aspects of the invention may be realized and obtained by means of the instrumentalities and combinations particularly pointed out hereinafter.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

Reference will now be made in detail to the preferred embodiments of the present invention, examples of which are illustrated in the accompanying drawings.

The invention includes a process for the production of a low density and porous zirconia ($ZrO_2$) powder partially alloyed with yttria, scandia, dysprosia, ytterbia, or any of the oxides of lanthanide or actinide, or any combination of the aforementioned oxides. The total amount of alloying oxides should be less than 30 weight percent. One example is a zirconia composite containing between approximately 6 to approximately 9 weight percent of yttria, but numerous other compositions are contemplated within the scope of the invention as claimed. When plasma sprayed under the same processing conditions, this powder exhibits a deposition efficiency of as much as 5 percent to 50 percent higher than that of a fully allowed powder of same composition and similar particle size distribution. The partially alloyed zirconia composite powder contains approximately 10 to approximately 75 volume percent of monoclinic phase $ZrO_2$ or unalloyed $ZrO_2$. Fully alloyed powder, including, for example, fused and crushed, plasma densified, agglomerated and sintered powder, typically contains less than 10 volume percent of monoclinic phase $ZrO_2$ or unalloyed $ZrO_2$.

Figure 1:
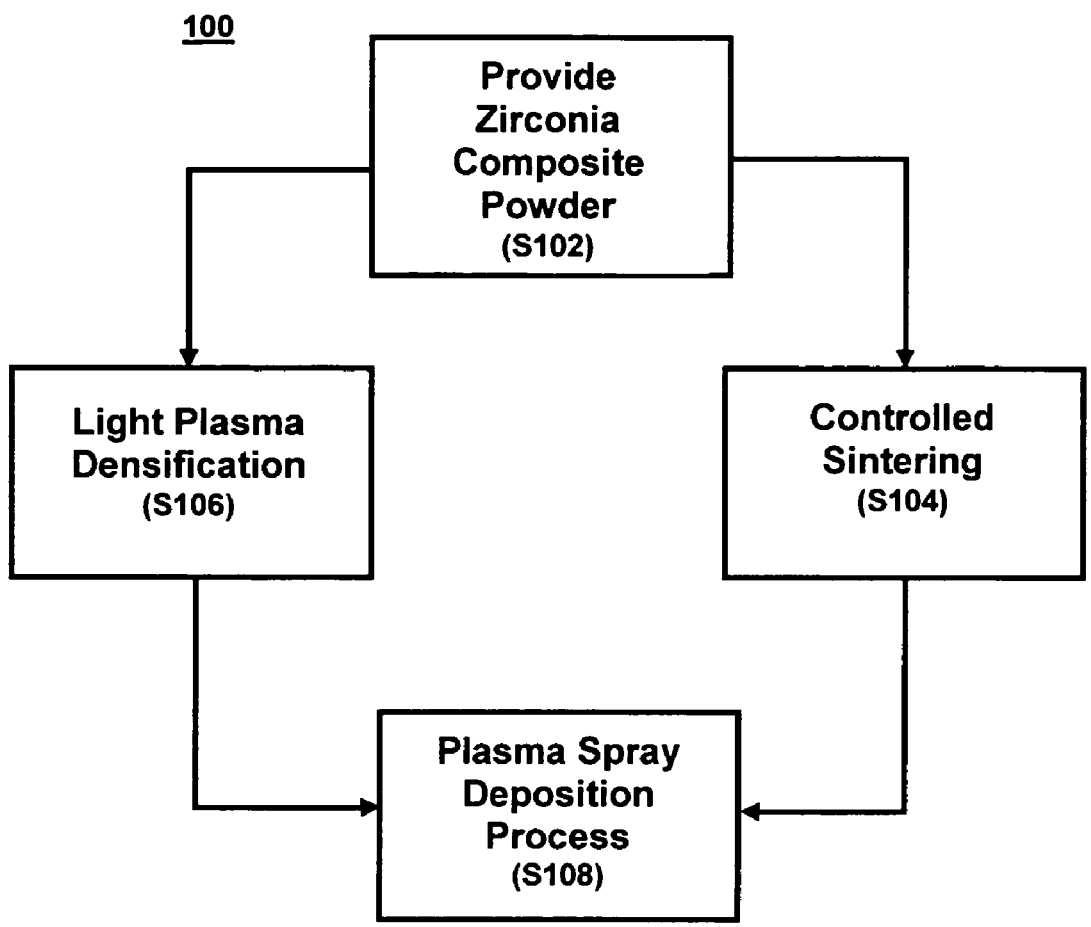
FIG. 1 provides a flow chart of a powder manufacturing process in accordance with the present invention.

FIG. 1 provides a flow chart for a method 100 of creating and applying a powder in accordance with the present invention. In step S102, a base powder material is provided. The base material is an agglomerated or chemically derived zirconia composite powder that contains proper amount of yttria, scandia, dysprosia, ytterbia, or any of the oxides of lanthanide or actinide, or any combination of the aforementioned oxides. The agglomerated powder of step S102 may be formed by, for example, spray drying, mechanical cladding, or attrition milling. Next, the base powder is partially alloyed through of either controlled sintering (step S104) or light plasma densification (step S106). Alternatively, the powder may be partially alloyed using a combination of sintering and plasma densification. In step S104, sintering can be performed in any furnace that can heat the powder to a temperature of 1400 degrees C. or higher.

Figure 2:
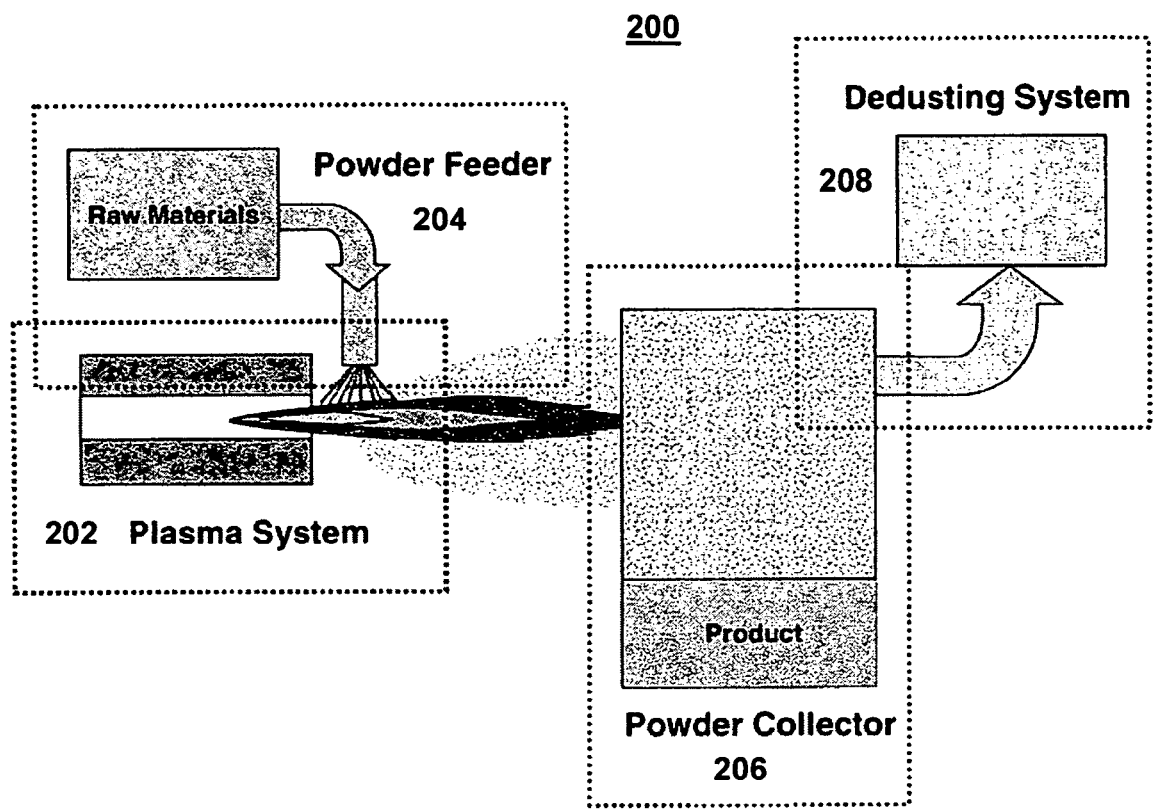
FIG. 2 provides a schematic of a plasma densification apparatus for use in accordance with the present invention.

In step S106, plasma densification is carried out in a plasma apparatus. A schematic of a plasma apparatus 200 in accordance with one embodiment of the present invention is shown in FIG. 2. The plasma apparatus 200 includes a plasma torch 202 with required power supply and cooling systems (not shown), a powder feeder 204, a chamber 206 to collect the powder, and a de-dusting system 208. The plasma torch 202 can be, for example, a DC plasma torch or an induction plasma torch. The plasma apparatus 200 can operate in air, low pressure, a vacuum, or controlled atmosphere.

In forming the partially alloyed powder, the sintering of step S104 or the plasma densification of step S106 is controlled to limit the alloying degree to about 25 to 90 percent. In other words, the monoclinic phase $ZrO_2$ in the product is maintained at about 10 to 75 volume percent. The resulting powder from either sintering step S104 or plasma densification step S106 has an apparent density of 1.0 to 2.0 g/cm$^3$. The resulting powder also has a typical particle size for thermal spray applications which is generally within mesh range equal to or finer than about 80 mesh (180 micrometers) and equal to or greater than about 5 micrometers.

Figure 3:
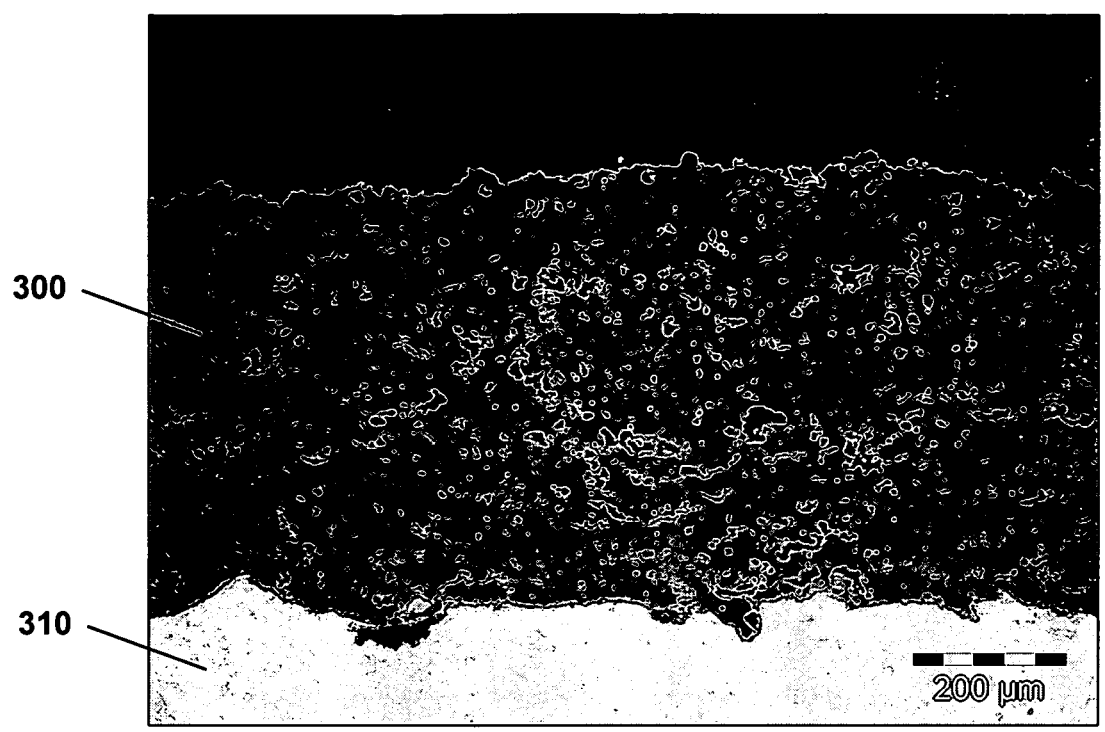
FIG. 3 provides a micrograph of the resultant coating made in accordance with at least one aspect of the present invention.

In step S108, the powder is deposited onto a substrate using a plasma spray process to form a coating so that the resultant coating will have a monoclinic phase content of less than 5 percent. When compared with fully-alloyed powders of the same particle size and plasma sprayed under the same processing conditions, this powder of the present invention exhibits an improvement in deposition efficiency of as much as 5 percent to 50 percent. FIG. 3 provides a micrograph of a cross section of the resultant coating 300 as applied to a substrate 310 in accordance with an embodiment of the above-described method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

The invention claimed is:

1. A zirconia ($ZrO_2$) composite powder partially alloyed with one or more of yttria, scandia, dysprosia, ytterbia, or any of the oxides of lanthanide or actinide, wherein a total amount of alloying oxides is less than 30 weight percent, wherein the powder has between approximately 10 to approximately 75 volume percent of monoclinic phase zirconia, and wherein the zirconia ($ZrO_2$) composite remains partially alloyed until treated to form a coating, wherein the apparent density of the composite powder is approximately 1.0 to approximately 2.0 g/cm$^3$.

2. The zirconia composite powder of claim 1, wherein the composite powder contains between approximately 6 and approximately 9 weight percent of yttria.

3. The zirconia composite powder of claim 1, wherein the composite powder has a typical particle size for thermal spray applications generally within a range between approximately 5 micrometers and approximately 180 micrometers.

4. A method of making a zirconia ($ZrO_2$) composite powder partially alloyed with one or more of yttria, scandia, dysprosia, ytterbia, or any of the oxides of lanthanide or actinide, in which a total amount of alloying oxides is less than 30 weight percent, the powder has between approximately 10 to approximately 75 volume percent of monoclinic phase zirconia, and the zirconia ($ZrO_2$) composite remains partially alloyed until treated to form a coating, comprising the steps of:

providing at least one of an agglomerated powder, a chemically derived zirconia composite powder and combinations thereof that contains less than approximately 30 weight percent of one or more of yttria, scandia, dysprosia, ytterbia, or any of the oxides of lanthanide or actinide; and sintering the at least one agglomerated powder, chemically derived powder and combinations thereof by heating the powder to at least approximately 1400° C., wherein the sintering process is controlled to limit the alloying degree to between approximately 25 to approximately 90 percent, wherein the apparent density of the partially alloyed zirconia composite powder is between approximately 1.0 and approximately 2.0 g/cm$^3$.

5. The method of claim 4, wherein the agglomerated powder is formed by at least one of spray drying, mechanical cladding, and attrition milling.

6. The method of claim 4, wherein the at least one agglomerated powder, chemically derived zirconia and combinations thereof composite powder contains between approximately 6 and approximately 9 weight percent of yttria.

7. The method of claim 4, wherein the partially alloyed zirconia composite powder has a typical particle size for thermal spray applications generally within a range between approximately 5 micrometers and about approximately 180 micrometers.

8. A method of making a zirconia (ZrO$_2$) composite powder partially alloyed with one or more of yttria, scandia, dysprosia, ytterbia, or any of the oxides of lanthanide or actinide of claim 1, comprising the steps of:

providing at least one of an agglomerated powder, a chemically derived zirconia composite powder and combinations thereof that contains less than approximately 30 weight percent of one or more of yttria, scandia, dysprosia, ytterbia, or any of the oxides of lanthanide or actinide;

and plasma densifying the at least one agglomerated powder, chemically derived powder and combinations thereof, wherein the plasma densification process is controlled to limit the alloying degree to between approximately 25 to approximately 90 percent.

9. The method of claim 8, wherein the agglomerated powder is formed by at least one of spray drying, mechanical cladding and attrition milling.

10. The method of claim 8, wherein the plasma densifying step is conducted in at least one of one of ambient air, low pressure and vacuum controlled atmosphere.

11. The method of claim 8, wherein the at least one agglomerated powder, chemically derived zirconia composite powder and combinations thereof contains between approximately 6 and approximately 9 weight percent of yttria.

12. The method of claim 8, wherein the partially alloyed zirconia composite powder has a typical particle size for thermal spray applications generally within a range between approximately 5 micrometers and about approximately 180 micrometers.

13. The method of claim 8, wherein the apparent density of the partially alloyed zirconia composite powder between approximately 1.0 and approximately 2.0 g/cm$^3$.

14. A method of making a zirconia (ZrO$_2$) composite powder partially alloyed with one or more of yttria, scandia, dysprosia, ytterbia, or any of the oxides of lanthanide or actinide of claim 1, comprising the steps of:

providing at least one of an agglomerated powder, a chemically derived zirconia composite powder and combinations thereof that contains less than approximately 30 weight percent of one or more of yttria, scandia, dysprosia, ytterbia, or any of the oxides of lanthanide or actinide;

and partially alloying the at least one agglomerated powder, chemically derived zirconia composite powder and combinations thereof using a combination of sintering and plasma densifying, wherein the combination of the sintering process and the plasma densification process is controlled to limit the alloying degree to between approximately 25 to approximately 90 percent.

15. The method of claim 14, wherein the plasma densifying step is conducted in at least one of ambient air, low pressure and vacuum controlled atmosphere.

16. The method of claim 14, wherein the sintering step includes heating the powder to at least approximately 1400° C.

17. The method of claim 14, wherein the at least one agglomerated powder, chemically derived zirconia composite powder and combinations thereof contains between approximately 6 and approximately 9 weight percent of yttria.

18. The method of claim 14, wherein the partially alloyed zirconia composite powder has a typical particle size for thermal spray applications generally within a range between approximately 5 micrometers and about approximately 180 micrometers.

19. The method of claim 14, wherein the apparent density of the partially alloyed zirconia composite powder is between approximately 1.0 and approximately 2.0 g/cm$^3$.

20. A method of applying a coating onto a substrate comprising: providing the zirconia (ZrO$_2$) composite powder partially alloyed with one or more of yttria, scandia, dysprosia, ytterbia, or any of the oxides of lanthanide or actinide, wherein a total amount of alloying oxides is less than 30 weight percent, the powder has between approximately 10 to approximately 75 volume percent of monoclinic phase zirconia, and the zirconia (ZrO$_2$) composite remains partially alloyed until treated to form a coating, and depositing the powder onto a substrate using a plasma spray process to form said coating, wherein the coating has a monoclinic phase content of less than approximately 5 percent.

* * * * *